United States Patent [19]
Fischer

[11] 3,728,789
[45] Apr. 24, 1973

[54] WIRE STRIPPER
[75] Inventor: Milton G. Fischer, Banning, Calif.
[73] Assignee: The Deutsch Company Electronic Components Division, Banning, Calif.
[22] Filed: June 25, 1971
[21] Appl. No.: 156,763

[52] U.S. Cl. ............................................... 30/90.1
[51] Int. Cl. ............................................. H02g 1/12
[58] Field of Search ................. 81/9.5 R, 9.51; 30/90.1

[56] References Cited
UNITED STATES PATENTS
1,867,712   7/1932   Reitzig .............................. 81/9.51

Primary Examiner—Granville Y. Custer, Jr.
Assistant Examiner—Roscoe V. Parker
Attorney—Gausewitz, Carr and Rothenberg

[57] ABSTRACT

A coaxial wire stripper including a body having an opening through which a wire is extended, a blade being positioned transverse to the opening and resiliently biased toward it by a spring-pressed pivotal arm, a member adjacent the body being selectively indexable to position different stops adjacent the pivotal arm to limit its movement to control the stroke of the blade toward the wire, and hence the depth of the cut, this member also including axially adjustable abutments engageable by the end of the wire for controlling the amount of wire exposed past the blade, and hence the position of the cut in the wire.

16 Claims, 15 Drawing Figures

Patented April 24, 1973
3,728,789
4 Sheets-Sheet 1
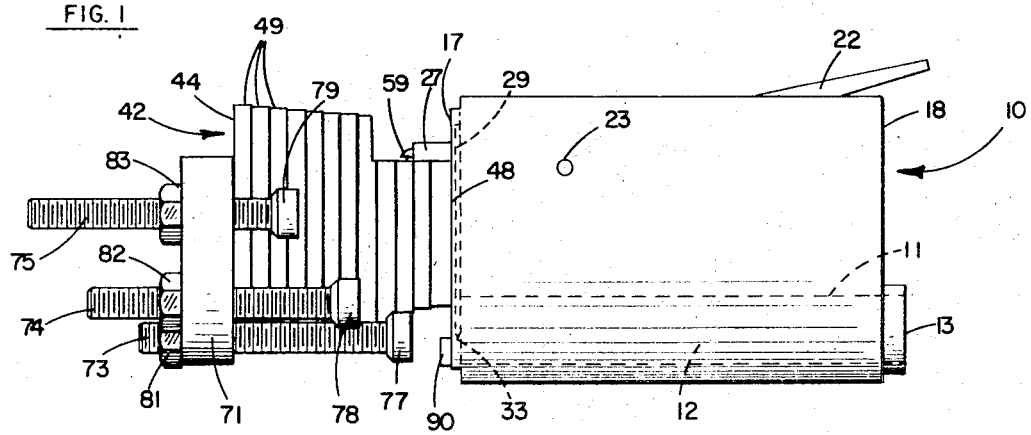
FIG. 1
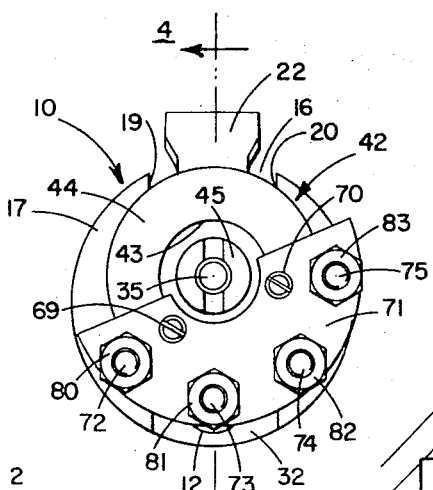
FIG. 2
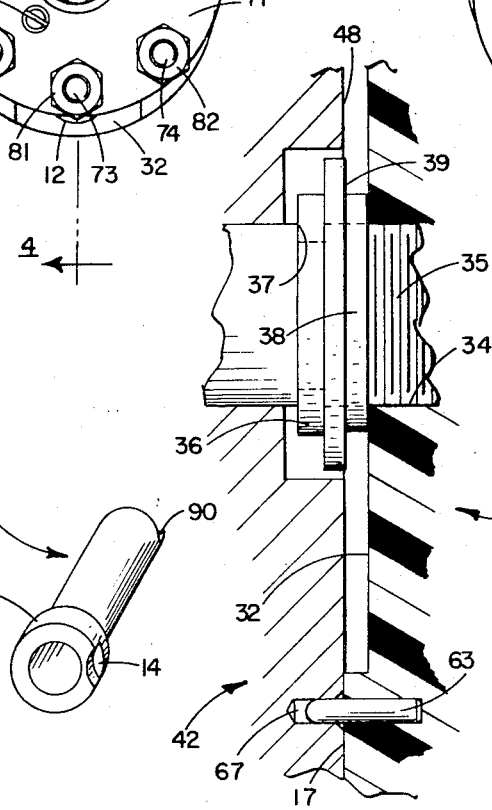
FIG. 3
FIG. 11
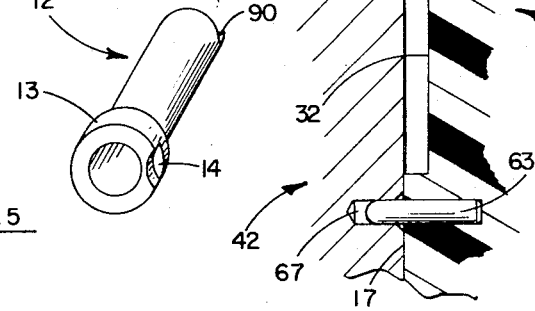
FIG. 5
INVENTOR
MILTON G. FISCHER
BY
ATTORNEYS

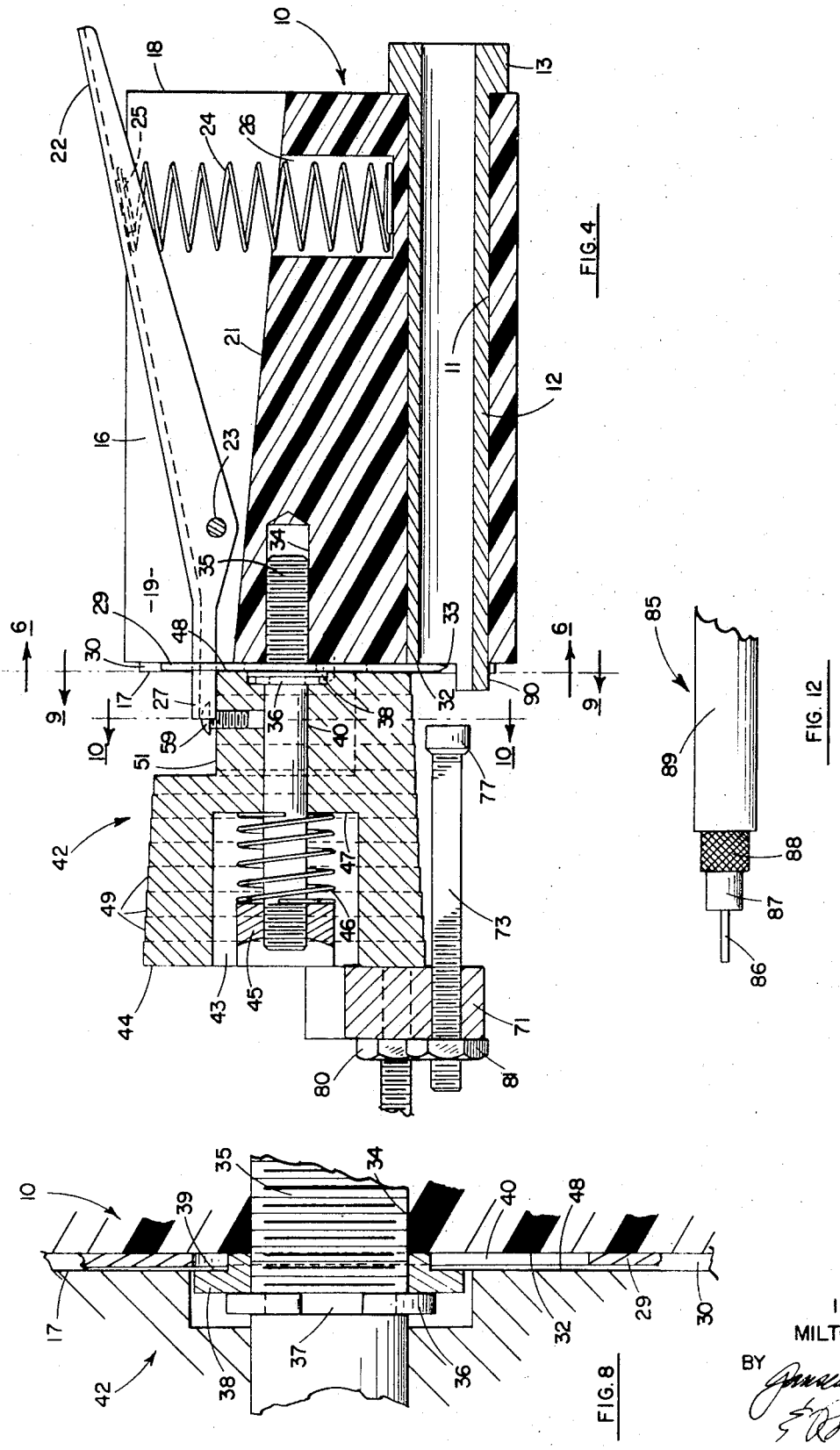

Patented April 24, 1973

INVENTOR
MILTON G. FISCHER

BY
ATTORNEYS

Patented April 24, 1973

INVENTOR
MILTON G. FISCHER

BY
ATTORNEYS

3,728,789

WIRE STRIPPER

BACKGROUND OF THE INVENTION

1. Field of the Invention

This invention pertains to a wire stripper.

2. Description of Prior Art

Preparation of coaxial wires by stripping their ends presents unique problems which have not been solved satisfactorily in the past. Wires of this type require three individual stripping steps so as to expose progressively predetermined lengths of its different components. Wire strippers designed in the past for accomplishing the necessary stripping operations for coaxial wire have been invariably bulky, complex and expensive. They are difficult to use and give imprecise results. The lengths of the exposed portions of the wire are difficult to control. Also, it cannot always be assured that the cutting of the layer of the wire is closely controlled. Under such circumstances, there may be damage to one of the conductors or to the insulation if a cut is made too deep.

SUMMARY OF THE INVENTION

The present invention provides an improved wire stripper for coaxial wire, which overcomes the problems of the past. It is a simple, low-cost, lightweight device, easily operated, yet providing superior results. The device is readily adjustable to accommodate wires of different sizes and to expose the various layers of the wire in desired lengths.

The wire stripper of this invention includes a body which has an opening extending longitudinally through it, adapted to receive a wire. At one end of the body is a flat blade guided for movement transverse to the opening. The blade is engaged by one end of a pivotal arm, the opposite end of which is biased by a compression spring to rotate the arm in a direction such that it urges the blade toward the opening in the body. Outwardly of the blade is a member which can be indexed in various predetermined rotational positions with respect to the body. This indexing member carries a plurality of radially aligned spaced screws which are individually positionable adjacent the end of the pivotal arm to terminate its rotational movement. This, in turn, controls the stroke of the blade relative to the opening that supports the wire. The screws can be repositioned by rotation to adjust the stroke of the blade.

An additional stop arrangement is provided for axially positioning the wire to control the position of the cut. This includes a plurality of screws threadably carried by the indexing member, these screws being individually positionable in alignment with the opening at the predetermined rotational positions of the indexing element. The threads of these additional screws permit their axial positioning relative to the opening to be controlled. The end of the wire is brought into engagement with the head of the selected screw to establish the length of the wire beyond the location of the cut.

In operation of the device, the wire is extended through the opening, and its end is engaged by one of the positioning screws. The pivotal arm is released so that the spring biases the arm rotationally which, in turn, moves the blade into engagement with the periphery of the wire. The body then is rotated around the wire, which causes the blade to progressively cut through the wire radially to the predetermined distance, at which time the end of the arm engages the stop screw and terminates the travel of the blade. The indexing member then is repositioned such that the wire can be extended further beyond the opening to engage a second positioning screw. Again, the pivotal arm is released and the blade engages the periphery of the wire to sever a portion of it radially as the body is rotated around the wire. The stop screw for the pivotal arm limits the travel of the blade to a shorter distance so that less of the wire will be cut in this operation. In this manner, through successive settings of the indexing member, a series of radial cuts may be made in the wire, each of controlled depth and at a selected position along the length of the wire. This allows successive layers of the wire to be removed, each without damage to the one beneath it.

BRIEF DESCRIPTION OF THE DRAWINGS

FIG. 1 is a side elevational view of the wire stripper of this invention;

FIG. 2 is an end elevational view of the wire stripper;

FIG. 3 is an end elevational view taken at the opposite end from that of FIG. 2;

FIG. 4 is an enlarged longitudinal sectional view taken along line 4—4 of FIG. 2;

FIG. 5 is a perspective view of the tube which may be used in supporting wires of smaller sizes;

FIG. 8 is an enlarged fragmentary view showing the means for retaining the blade;

FIG. 11 is an enlarged fragmentary sectional view taken along line 11—11 of FIG. 6, with the blade omitted for clarity;

FIG. 12 is an elevational view of a wire which has been stripped by the tool of this invention.

DESCRIPTION OF THE PREFERRED EMBODIMENT

Figure 6:
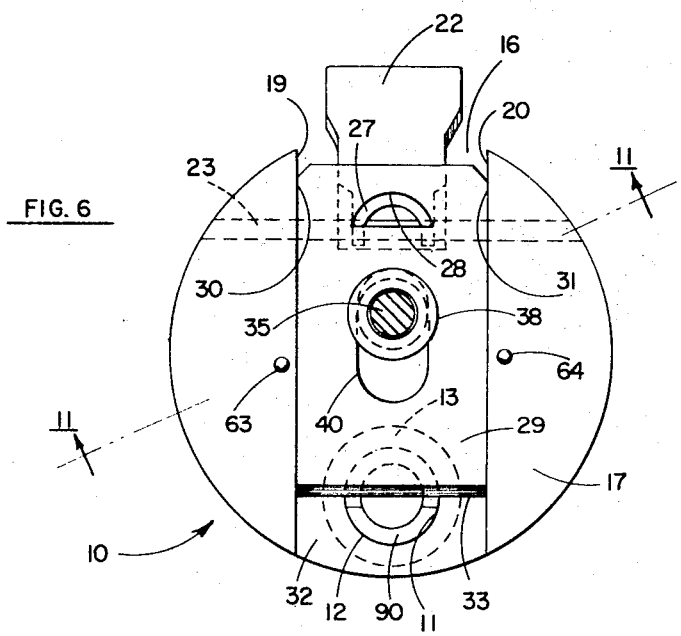
FIG. 6 is a transverse sectional view taken along line 6—6 of FIG. 4.

The wire stripper of this invention includes a body 10, appropriately made of plastic material, which may have a cylindrical exterior shape. At the lower portion of the body 10, as illustrated in FIG. 4, is a cylindrical opening 11, which extends for the length of the body parallel to its axis. The opening 11 may receive a tube 12 which at one end has a head 13 with a radial recess 14 on its periphery. The undersurface of the head of a screw 15 engages the head 13 of the tube 12 at the recess 14, thereby holding the tube 12 in the opening 11 (see FIGS. 3 and 5).

The upper portion of the body includes a slot 16 that extends longitudinally from the forward end 17 of the body to the rearward end 18. The sidewalls 19 and 20 of the slot 16 are parallel and straddle a plane diametrical relative to the body. The bottom wall 21 of the slot 16 slopes toward the rearward end of the body, so that the slot 16 is deeper at the rearward end than at the forward end.

Received within the slot 16 is a handle 22 which is pivotally mounted on a pin 23 that extends transversely of the body through the slot 16 and the side portions of the handle 22. One end of a compression spring 24 bears against the undersurface of the elongated rearward portion of the handle 22, where it is centered by a boss 25. The opposite end of the spring 24 is received in a radial cylindrical opening 26 at the base of the slot 16, which holds and positions the spring 24, as seen in FIG. 4.

Figure 7:
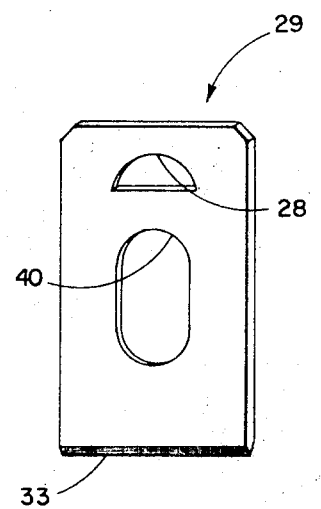
FIG. 7 is a perspective view of the blade of the wire stripper.
Figure 10:
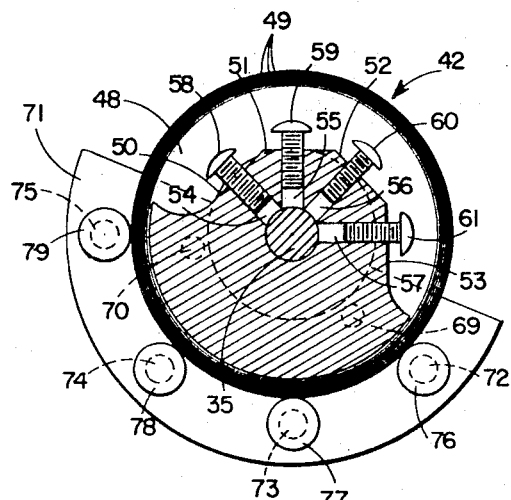
FIG. 10 is a transverse sectional view taken along line 10—10 of FIG. 4.
Figure 9:
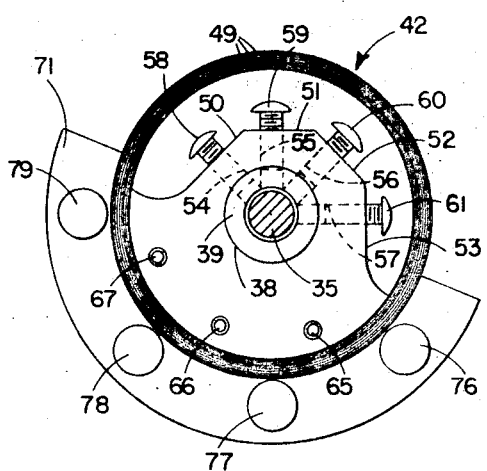
FIG. 9 is a transverse sectional view taken along line 9—9 of FIG. 4.
Figure 15:
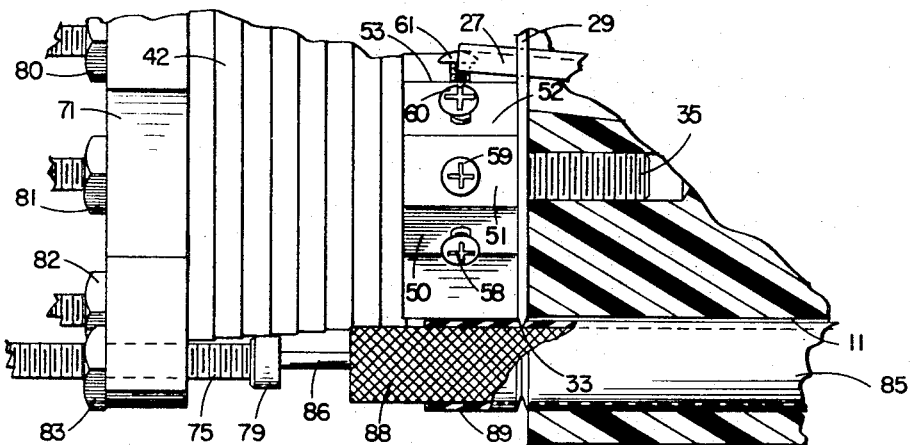
FIGS. 13, 14 and 15 are fragmentary views illustrating the successive steps in stripping a coaxial cable.
Figure 14:
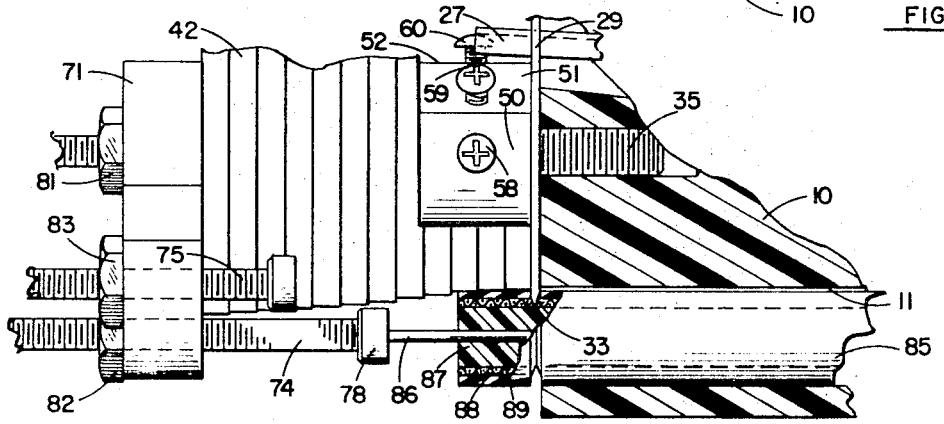

The relatively short forward end 27 of the handle 22 projects beyond the forward end 17 of the body 10. This portion of the handle is arcuate in cross section and extends through a generally semicircular opening 28 in a blade 29. The latter member, shown by itself in FIG. 7, is a thin, flat blade generally resembling the type used in safety razors. A shallow diametrical recess at the forward end 17 of the body 10, having parallel side edges 30 and 31 and a flat inner face 32, receives and guides the blade 29. With the forward end 27 of the handle 22 being received in the opening 28 in the blade 29, the blade will move within its recess, in a path normal to the axis of the opening 11, in response to movement of the handle 22. The compression spring 24 biases the handle 22 in a counterclockwise direction as the device is illustrated, which urges the blade 29 downwardly. In such position of the blade 29, its lower sharpened edge 33 is immediately adjacent the forward end of the longitudinal opening 11 in the body 10, and intersects a continuation of the opening.

A longitudinal tapped opening 34, extending inwardly from the forward end 17 of the body 10 above and parallel to its longitudinal axis, receives the threaded end of a stud 35. A snap ring 36 in an annular groove 37 in the stud 35, as shown in the enlarged view of FIG. 8, bears against one end of a spacer 38. The latter member is of reduced diameter at its opposite end, with an intermediate radial shoulder 39. The smaller end of the washer 38 engages the inner surface 32 of the recess for the blade. The blade 29 has a longitudinally enlarged opening 40 through which passes the stud 35 and the smaller inner end of the spacer washer 38, while the radial shoulder 39 of the washer holds the blade in its recess.

The stud 35 extends through a generally complementary axial opening 41 in a member 42 positioned at the forward end of the body 10. The outer end of the stud 35 is within a counterbore 43 that extends inwardly from the outer end 44 of the member 42. A nut 45 is received on the outer end of the stud 35, a compression spring 46 being positioned between the undersurface of the nut 45 and the inner radial wall 47 of the counterbore 43. Therefore, the force of the compression spring 46 biases the member 42 to the right, as illustrated, to urge its inner end surface 48 against the forward end 17 of the body 10.

The exterior of the member 42, as seen in FIGS. 1 and 4, is of stepped configuration defined by a series of concentric circumferential surfaces 49 of equal lengths, progressively decreasing in diameter from the outer end 44 to the inner end 48 of the member 42. Adjacent the end 48, the circumferential wall of the member 42 is cut away to provide four longitudinally extending surfaces 50, 51, 52 and 53, which are spaced progressively farther from the longitudinal axis of the member 42. Radial tapped holes 54, 55, 56 and 57 extend inwardly from the surfaces 50, 51, 52 and 53, respectively, and receive screws 58, 59, 60 and 61.

An indexing arrangement is provided, whereby the member 42 may assume four predetermined rotational positions relative to the body 10. Two pins 63 and 64 project longitudinally from the forward face 17 of the body 10 on opposite sides of the blade recess. In the end 48 of the member 42 are three angularly spaced longitudinal openings 65, 66 and 67 which are dimensioned to receive the pins 63 and 64. In two of the predetermined positions, the pin 63 is received in the opening 65 and the opening 66. The other pin 64 then clears the end wall 48 of the member 42. In the other two positions of the member, the pin 64 enters the openings 66 and 67, while the pin 63 is not in use. Movement from one rotational position to the other is accomplished by pulling outwardly on the member 42, compressing the spring 46 and freeing the pin 63 or 64 from the opening which receives it. The member 42 then may be rotated to the desired position where the pin 63 or 64 may enter one of the openings 65, 66 and 67. The compression spring 46 normally holds the member 42 against axial movement relative to the body 10 so that it does not disengage the indexing pin.

In the four predetermined angular positions of the member 42, each of the four flat longitudinal surfaces 50, 51, 52 and 53 becomes located selectively at the upper side of the member 42 adjacent and aligned with the forward end 27 of the handle 22. This permits any one of the screws 58, 59, 60 and 61 to be positioned adjacent the forward end 27 of the handle. When so located, the selected screw is engaged by the forward end 27 of the handle 22 when the handle is at the end of its travel in the counterclockwise direction as urged by the spring 24. In other words, any one of the screws 58, 59, 60 and 61 can serve as a stop to limit the angular movement of the handle 22. This, in turn, governs the stroke of the blade 29, because the travel of the blade is determined by that of the handle 22. The screws 58, 59, 60 and 61 normally are set at different distances from the axis of the member 42 so that they will result in four different limiting positions for the blade 29. Of course, during indexing of the member 42, the rearward end of the handle 22 is compressed inwardly to raise its forward end 27 so that it will clear the screws 58, 59, 60 and 61, and their adjacent flat surfaces 50, 51, 52 and 53 as the member 42 is repositioned.

Secured to the outer end 44 of the member 42 by means of screws 69 and 70 is a generally crescent-shaped member 71 which is provided with tapped openings that receive four screws 72, 73, 74 and 75. These screws are parallel to the longitudinal axis of the member 42 and the body 10. The screws 72, 73, 74 and 75 are angularly spaced on the member 71 and positioned so that they are selectively alignable with the axis of the cylindrical opening 11 through the body 10 at the indexed positions of the member 42. In other words, at each of the four predetermined rotational positions of the member 42, one of the screws 72, 73, 74 and 75 will be located directly beyond the opening 11. The screw 72 is aligned with the opening 11 when the stop screw 58 is positioned adjacent the end 27 of the handle 22. The operative positions of the screws 73, 74 and 75 correspond to those of the screws 59, 60 and 61, respectively.

The heads 76, 77, 78 and 79 of the respective screws 72, 73, 74 and 75 present flat radial surfaces adjacent the end of the opening 11 when in their indexed positions. The axial positions of the screws 72, 73, 74 and 75 may be adjusted by loosening jam nuts 80, 81, 82 and 83 and appropriately rotating the screws relative to the member 71. The nuts 80, 81, 82 and 83, when tightened, maintain the adjusted positions of the screws.

In operation of the wire stripper, a wire is inserted into the opening 11 to have successive cuts made in its periphery by the blade 29. The stop screws 76, 77, 78 and 79 are used as abutments to position the wire axially relative to the blade, while the screws 58, 59, 60 and 61 provide abutments that establish the travel of the blade for the cuts to be made. Three cuts are necessary in stripping a coaxial cable. Four sets of stops are included, however, in order to enable the wire stripper to accommodate the full range of commercially available coaxial cable sizes. The three stop screws 58, 59 and 60 which allow for maximum blade travel are used in stripping coaxial cable of smaller diameter. For larger coaxial cable, less blade movement is required so that stop screws 59, 60 and 61 are utilized.

A typical coaxial cable 85 is shown in FIG. 12, having a center conductor 86, a layer of insulation 87 around this conductor, and a braid shield 88 around the insulation 87. On the outside is a covering of insulation 89. The wire 85 is to be prepared so that the center conductor 86 has an exposed portion of a predetermined length at the end of the wire, with the shield 88 being exposed for a predetermined length beyond the outer insulation 89, and trimmed so as to expose a certain length of the insulation 87.

The wire 85 in the example shown is within the range of larger sized coaxial cables. Therefore, the stop screws 59, 60 and 61 are used to establish the stroke of the blade 29. These stop screws are used in conjunction with the wire-positioning screws 73, 74 and 75. In setting the stops, the screw 73 is adjusted so that the outer end of its head 77 is spaced from the blade 29 a distance corresponding to the desired exposed length of the inner conductor 86. This adjustment is easily accomplished because of the stepped outer configuration of the member 42, which has separate circumferential portions 49 that provide visible lines of demarcation at predetermined distances. Typically, each of the circumferential parts 49 is one-sixteenth inch in length. With the screw 73 positioned properly, the corresponding stop screw 59 for the handle 22 is set to allow a predetermined relatively long stroke of the blade 29.

The stop screw 74 is adjusted so that the outer surface of its head 78 is a distance from the blade 29 which corresponds to the combined exposed lengths of the inner conductor 86 and the inner insulation 87. The stop screw 60 for the handle 22, which comes into operation when the screw 74 is in use, is adjusted to permit a shorter stroke of the blade 29 than that permitted by the screw 59.

Finally, the screw 75 is positioned so that its head 79 is spaced from the blade 29 a distance equal to the combined desired lengths of the exposed inner conductor 86, inner insulation 87 and the braid shield 88. The stop screw 61, which is used in conjunction with the screw 75, is positioned so that the blade has a predetermined stroke less than either of the other set strokes of the blade.

Figure 13:
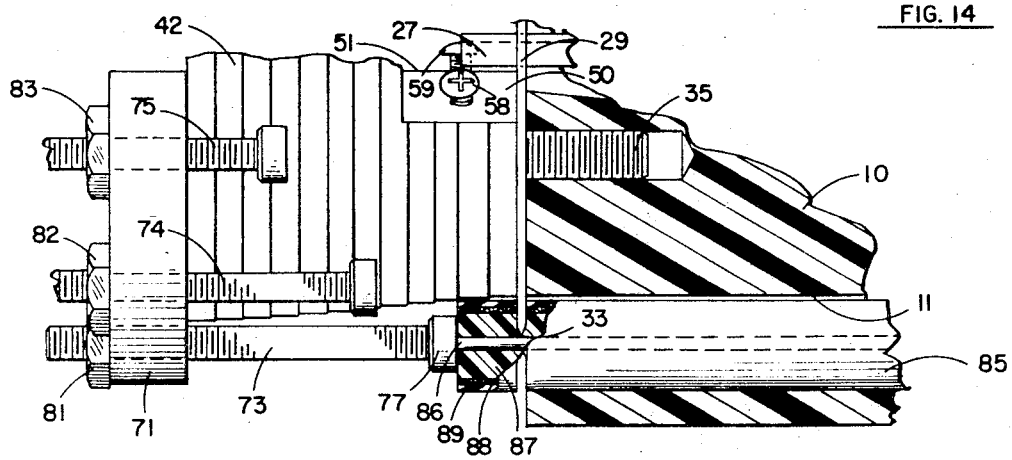

The member 42 is rotationally positioned so that, initially, the stop screw 73 is aligned with the opening 11 and the stop screw 59 is positioned beneath the end 27 of the handle 22. The tube 12 is omitted in this instance because the cable 85 is not one of the smaller sizes. The handle 22 is depressed, and the wire 85 is inserted into the opening 11 in the body 10 and extended outwardly until its end engages the head 77 of the screw 73, as shown in FIG. 13, positioning the wire axially relative to the blade 29. Than the handle 22 is released, and the spring 24 is allowed to bias it in a counterclockwise direction, as illustrated. This moves the cutting edge 33 of the blade 29 downwardly to engage the periphery of the wire 85. The blade bears against the wire 85 with a predetermined force resulting from the spring rate and the mechanical advantage of the pivotally mounted handle 22. With the blade 29 so engaging the wire 85, the entire wire stripper assembly is rotated around the wire 85. This causes the blade 29 to cut through the outer insulation 89, the braid shield 88 and the inner conductor 87. When set properly, the screw 59 stops the handle 22 in a position where the cutting edge 33 of the blade 29 is adjacent but not touching the periphery of the conductor 86. The periphery of the opening 11 supports the wire 85 in a fixed position laterally so that the blade can be adjusted to penetrate the wire 85 to a precise depth. With the force on the blade 29 established by the spring 24, the cut is gradual, and the material of the wire 85 is severed cleanly. All the material around the inner conductor 86 is cut radially by this operation, and the severed portion easily is pulled off the end of the inner conductor. The wire 85 is fully supported during the cutting operation by its engagement with the wall of the opening 11 opposite from the blade.

For the next operation, the member 42 is rotated relative to the body 10 to bring the screw 74 into alignment with the opening 11. The handle 22 is depressed; the wire 85 is repositioned axially by extending it farther beyond the body 10 so that its end engages the head 78 of the screw 74. Then the handle is released to enable the spring 24 to move the blade 29 inwardly to re-engage the wire 85. Again, the wire stripper assembly is rotated around the wire, and the blade makes its cut. This time, the handle end 27 is stopped by the screw 60, so that the handle 22 moves the blade through a shorter increment such that it penetrates the outer insulation 89 and the braid shield 88, stopping at the outer surface of the inner insulator 87. The separated portion of the wire 85 beyond the blade 29 is readily removed following the second cut.

For the third and final operation, the screw 75 is positioned in alignment with the opening 11, which positions the screw 61 beneath the end 27 of the handle 22. With the handle depressed, the wire 85 is extended so that its end engages the head 79 of the screw 75, following which the handle is released so that the spring 24 moves the blade inwardly against the wire. Rotation of the wire stripper around the wire causes the blade 29 to cut the outer layer of insulation 89, while the screw 61 stops the movement of the blade at the outer surface of the braid shield 88. This completes the wire stripping operation as the severed portion of the insulation 89 is slipped off the end of the wire.

The entire wire stripping operation is accomplished quite rapidly through very simple operations. The results are superior as the various cuts are made to precise lengths and depths. Proper settings are readily made and assure that the wire is undamaged after the stripping operation. The wire stripper is compact in size and economically manufactured, while being easily manipulated.

When smaller sizes of coaxial cables are being stripped, the extension 90 of the tube 12, which is a segment of the tube, provides a support directly in alignment with the blade 29. This is needed because the smaller wires are less rigid than those of larger size. The recess 14 in the flange 13 of the tube 12, engaged by the head of the screw 15, indexes the tube so that the inner wall of the extension 90 is opposite from the blade 29.

The foregoing detailed description is to be clearly understood as given by way of illustration and example only, the spirit and scope of this invention being limited solely by the appended claims.

I claim:

1. A wire stripper comprising
 a blade,
 guide means for said blade for permitting movement thereof in a predetermined path,
 resilient means biasing said blade in one direction in said predetermined path,
 stop means for limiting the movement of said blade in said one direction,
  said stop means including a plurality of elements individually positionable in operative relationship with said blade for so limiting said movement of said blade,
   said elements being individually adjustable for permitting successive strokes of said blade of different distances in said predetermined path,
 lateral wire support means adjacent said blade such that a wire supported thereby is engageable by said blade upon said movement of said blade in said one direction,
 and wire positioning means for axially positioning such a wire relative to said blade,
  said wire positioning means including a plurality of elements individually positionable adjacent said lateral wire support means for individual engagement thereof by a wire for so axially positioning the same,
   said elements of said wire positioning means being individually adjustable for positioning such a wire at different axial positions relative to said blade.

2. A device as recited in claim 1 in which said resilient means biasing said blade in one direction includes
 a member engaging said blade for causing said blade to move therewith,
 means pivotally mounting said member,
 and a spring engaging said member and biasing said member pivotally in a direction in which said member biases said blade in said one direction.

3. A device as recited in claim 2 in which said member is pivotal in the opposite direction in opposition to said spring for moving said blade in a direction opposite to said one direction.

4. A wire stripper comprising
 a blade,
 guide means for said blade for permitting movement thereof in a predetermined path,
 resilient means biasing said blade in one direction in said predetermined path,
  said resilient means including
   a member engaging said blade for causing said blade to move therewith,
   means pivotally mounting said member,
   and a spring engaging said member and biasing said member pivotally in a direction in which said member biases said blade in said one direction,
 stop means for limiting the movement of said blade in said one direction,
  said stop means including
   a rotatable element, and
   a plurality of angularly spaced abutment means on said rotatable element,
    said abutment means being adjustable for varying the distances thereof from the axis of rotation of said rotatable element, said abutment means upon rotation of said rotatable element being individually positionable adjacent said member for engagement thereby upon said pivotal movement of said member in said one direction, for thereby limiting the pivotal movement of said member and the distance of the stroke said member imparts to said blade,
 lateral wire support means adjacent said blade such that a wire supported thereby is engageable by said blade upon said movement of said blade in said one direction, and wire positioning means for axially positioning such a wire relative to said blade,
  said wire positioning means being adjustable for positioning such a wire at different axial positions relative to said blade.

5. A device as recited in claim 4 in which said abutment means includes a plurality of threaded members, said rotatable element having generally radial openings threadably receiving said threaded members, said threaded members having outer surfaces engageable by said pivotal member when positioned adjacent said pivotal member.

6. A device as recited in claim 4 in which said wire positioning means includes
 a plurality of additional abutments spaced outwardly from said wire support means,
  said additional abutments being individually positionable adjacent said wire support means for engagement by the end of a wire supported by said wire support means,
  said additional abutments being adjustable for varying the distances thereof from said blade when so positioned in adjacency with said wire support means for thereby adjusting the axial position of a wire so engaged thereby relative to said blade.

7. A device as recited in claim 6 in which said additional abutments are carried by said rotatable element.

8. A device as recited in claim 7 in which said wire support means includes
 a body having an elongated opening therein adapted to receive a wire, said opening having an end adjacent said blade for permitting a wire to be projected beyond said end for engagement by said blade.

9. A device as recited in claim 8 in which said additional abutments include a plurality of substantially parallel additional threaded members, said rotatable element threadably receiving said additional threaded members, said additional threaded members being individually positionable in axial alignment with said opening in said body upon predetermined rotational positioning of said rotatable element.

10. A device as recited in claim 9 including indicia on the exterior of said rotatable element for facilitating the adjustment of said additional threaded members relative thereto.

11. A device as recited in claim 10 in which for said indicia said rotatable element has a plurality of individual circumferential segments on the outer periphery thereof, said segments being of predetermined length and interconnected to provide a stepped exterior for said rotatable element.

12. A wire stripper device comprising
a body,
  said body having an opening extending from a first end to a second end thereof,
a flat blade,
  said first end having a recess therein receiving said blade for guiding the same in a path transverse to said opening,
a lever,
means pivotally connecting said lever to said body,
  said blade having an opening therethrough, one end portion of said lever on one side of said pivotal connecting means extending through said opening in said blade,
    whereby pivotal movement of said lever causes movement of said blade toward or away from said opening in said body,
a spring engaging said lever on the opposite side of said pivotal connecting means and biasing said lever in one pivotal direction so as to urge said blade toward said opening in said body,
a rotatable means,
means rotatably mounting said rotatable means adjacent said first end of said body,
a plurality of first threaded members carried by said rotatable means,
means for indexing said rotatable means so as to selectively hold the same in different predetermined rotational positions relative to said body,
  one of said first threaded members being positioned adjacent said one end portion of said lever in each of said predetermined rotational positions for engagement by said one end portion and limiting said movement of said lever in said one pivotal direction,
    thereby limiting said movement of said blade toward said opening in said body,
  each of said first threaded members being adjustable in position for adjusting the limit of said movement of said lever in said one direction,
and a plurality of second threaded members carried by said rotatable means,
  one of said second threaded members being positioned substantially in alignment with said opening in said body in each of said predetermined rotational positions for engagement by the end of a wire extending through said opening in said body for thereby axially positioning said wire,
  said second threaded members being adjustable in position for varying the axial position of said wire.

13. A device as recited in claim 12 in which said indexing means includes
at least one pin projecting outwardly from said one end of said body,
  the adjacent face of said rotatable means having a plurality of openings each of which is adapted to receive said pin in a predetermined rotational position of said rotatable means,
and resilient means biasing said rotatable means toward said one end of said body for normally holding said pin in one of said openings in said rotatable means.

14. A device as recited in claim 13 in which there are four of said first threaded members and four of said second threaded members for providing a substantially large range of adjustments.

15. A device as recited in claim 14 including in addition a tube positionable in said opening in said body for supporting wires of relatively small sizes.

16. A device as recited in claim 15 in which said tube includes a segment projecting outwardly from said one end of said body and opposite from said blade for enhancing the support provided by said tube.

* * * * *